5
United States Patent Office 3,524,849
Patented Aug. 18, 1970

1

3,524,849
PROCESS FOR THE PREPARATION OF PYRROLO-BENZODIAZEPINE ACRYLAMIDES AND INTERMEDIATES USEFUL THEREIN
Andrew David Batcho, North Plainfield, and Willy Leimgruber, Montclair, N.J., assignors to Hoffmann-La Roche Inc., Nutley, N.J., a corporation of New Jersey
No Drawing. Filed Oct. 27, 1967, Ser. No. 678,532
Int. Cl. C07d 53/06
U.S. Cl. 260—239.3                              6 Claims

ABSTRACT OF THE DISCLOSURE

Pyrrolo benzodiazepine acrylamide compounds of the formula

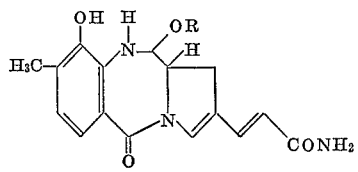

wherein R is either hydrogen or methyl are prepared by a multistep process utilizing 3-benzyloxy-2-nitro-p-toluoyl chloride and L-4-hydroxyproline methyl ester as the starting materials. Novel intermediates produced in the various process steps are also disclosed. The final products are chemotherapeutically active and are useful as antitumor agents, they also are useful as intermediates for preparing chemotherapeutically active compounds.

BACKGROUND OF THE INVENTION

Compounds represented by the formula

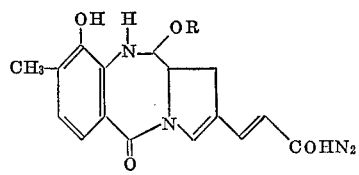

wherein R is either hydrogen or methyl, could heretofore only be prepared by a process wherein the starting materials utilized in subsequent chemical procedures were obtained by fermentation processes utilizing two strains of the genus Streptomyces and the species refuineus var. thermotolerans having NRRL numbers 3143 and 3144. The fermentation processes are disclosed in detail in copending U.S. patent application Ser. No. 416,599 filed Dec. 7, 1964 by Berger et al., now U.S. Pat. No. 3,361,-742. These products are therapeutically useful as antitumor agents or can be used as intermediates for preparing other therapeutically useful compounds such as those disclosed in copending U.S. patent applications Ser. Nos. 620,618 and 629,595, now U.S. Pat. No. 3,452,871, both filed Mar. 6, 1967 by Leimgruber et al.

SUMMARY OF THE INVENTION

This invention relates to the chemical total synthesis of compounds represented by Formula I. More particularly, this invention relates to a process for preparing compounds represented by Formula I utilizing 3-benzyloxy-2-nitro-p-toluoyl chloride or its acyl equivalents, e.g., bromide, esters, anhydrides and the like and L-4-hydroxyproline lower alkyl ester preferably the methyl ester, as the starting materials. This invention also relates to novel intermediates useful in the preparation of the compounds represented by Formula I.

DETAILED DESCRIPTION OF THE INVENTION

It has been found that in preparing the compounds represented by Formula I, it is advantageous to first prepare the methyl ether i.e., the compound wherein R in Formula I is methyl since this compound is stable and can be converted into the hydroxy compound, i.e., where-in R in Formula I is hydrogen.

In the following flow diagram, for convenience, the trans isomers are depicted. In instances wherein both cis and trans isomers are found, the trans isomer predominates, however, the cis isomer is included within the scope of this invention, as are mixtures of the cis and trans compounds.

The desired compounds, shown as 14 and 16 on the flow diagram can be produced chemically utilizing different intermediates, depending upon the synthesis route chosen.

For example, compound 10 on the flow diagram can be prepared by following reactions A through J, inclusive. This compound can then be converted to compound 14 and subsequently compound 16 by following reactions O through S, inclusive. This reaction route is the most direct route and is thus preferred.

If it desired to utilize compound 17 as an intermediate to preparing compounds 14 and 16, then reactions A through K, inclusive, are utilized and subsequently reactions L through S are utilized.

Compound 10, a key intermediate in the chemical total synthesis of the compounds represented by Formula I can also be formed as the result of degradation of compound 14, as shown by reactions T, U, V, W, M and N.

L-4-hydroxyproline lower alkyl ester, preferably, methyl ester, is reacted with a 3-benzyloxy-2-nitro-p-toluoyl halide, anhydride or ester, preferably, the halide, especial-

FLOW DIAGRAM
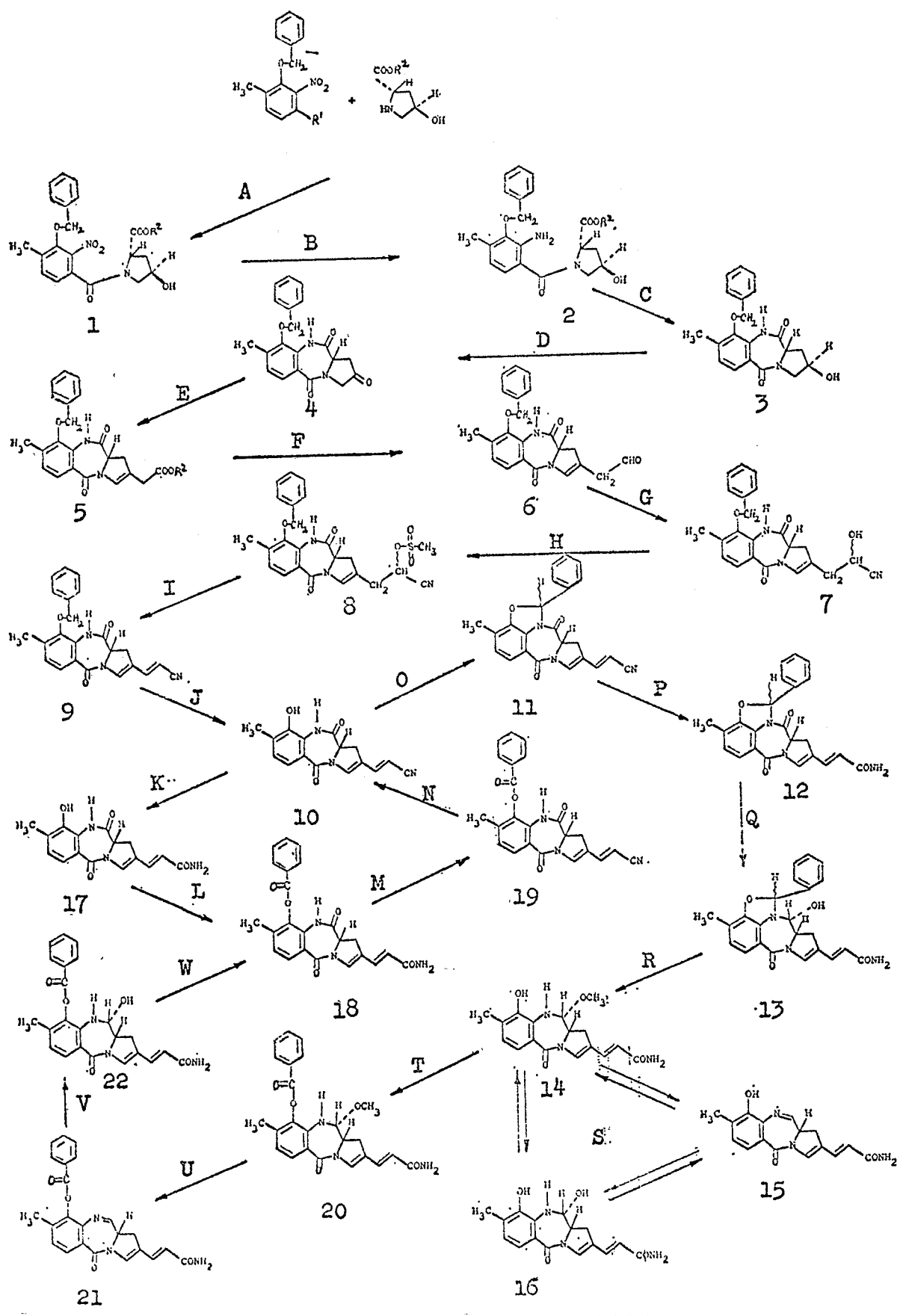

ly the chloride, to produce a substituted benzamide according to the following reaction A:

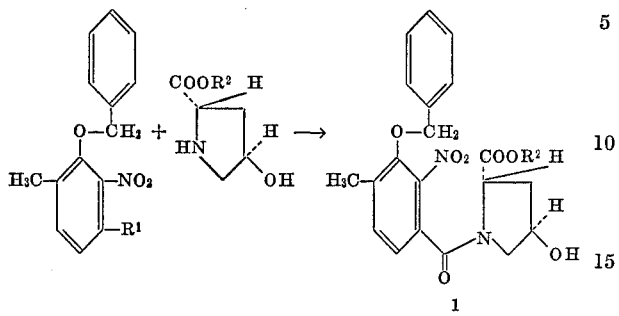

This reaction is effected in the presence of a base, preferably, a lower alkyl tertiary amine, e.g., triethylamine, and is carried out at room temperature, e.g. 20–25° C., for a time sufficient to complete the reaction, e.g. about 15 minutes to about an hour, preferably 30 minutes. The product, 1-(3-benzyloxy-2-nitro-p-toluoyl)-L-(4-hydroxyproline) lower alkyl ester is a crystalline material; the preferred compound, the methyl ester is a white crystalline material.

The nitro group of the compound produced by reaction A is subsequently reduced according to the following reaction B:

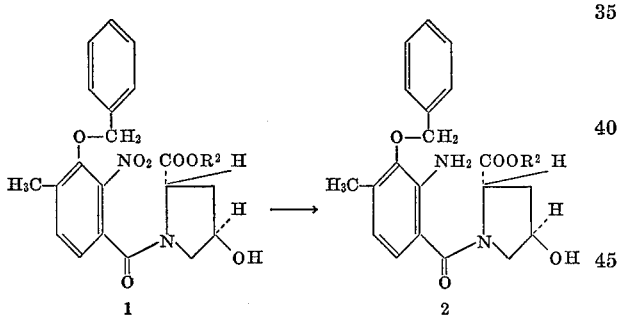

The reaction is effected by using sodium dithionite and is carried out at slightly elevated temperatures, e.g., about 35° C. to 45° C., for a time sufficient to complete the reaction. In order to characterize the resulting product, 1-(3-benzyloxy-2-amino-p-toluoyl)-L-(4-hydroxyproline) lower alkyl ester, it can be isolated as the hydrobromide.

The product from reaction B is cyclized according to the following reaction C:

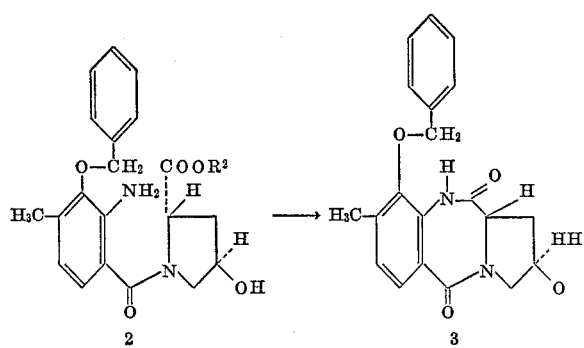

This cyclization is effected by heating overnight in a suitable solvent, e.g. xylene, at reflux in an inert atmosphere. The resulting product, (2R,11aS)-9-benzyloxy-1,2,3,11a-tetrahydro - 2 - hydroxy-8-methyl-5H-pyrrolo [2,1-c][1,4]benzodiazepine-5,11 - (10H) - dione, is recovered as white crystals.

The secondary alcohol produced by reaction C is subsequently oxidized to the corresponding ketone, according to the following reaction D:

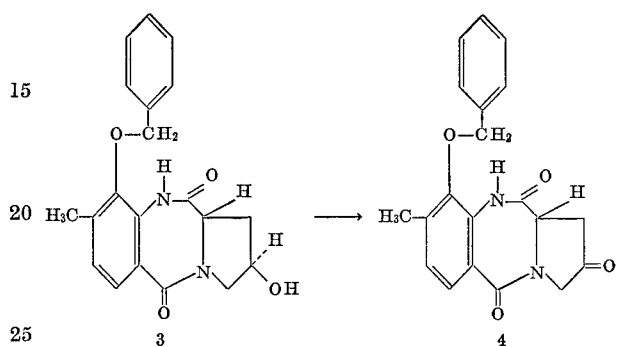

The oxidation is effected by Jones reagent.[1] The reaction is carried out at room temperature, e.g., about 20° C. to about 25° C., for a time sufficient to complete the reaction, usually about 2 to 3 hours. The product, (11aS)-9-benzyloxy - 8 - methyl-1H-pyrrolo[2,1-c][1,4]benzodiazepine-2,5,11(3H,10H,11aH)-trione can be isolated in two isomorphic forms, prisms and needles.

The ketone of reaction D is subsequently treated according to the following reaction E:

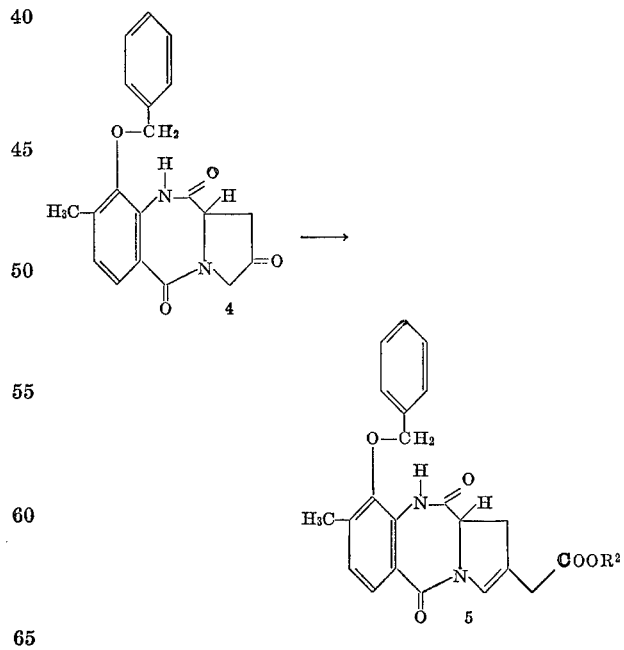

This condensation reaction in which the condensing agent is trilowerealkylphosphonoacetate is carried out at about 10° C. for about 30 minutes to about 2 hours. The product, (11aS) - 9 - benzyloxy-5,10,11,11a-tetrahydro-8-methyl - 5,11 - dioxo-1H-pyrrolo[2,1-c][1,4]benzodiazepine-2-acetic acid lower alkyl ester, is recovered.

[1] K. Bowden, I. M. Heilbron, E. R. H. Jones, and B. C. L. Weedon, J. Chem. Soc., p. 39 (1946).

The ester from reaction E is subsequently reduced to the aldehyde according to the following reaction F:

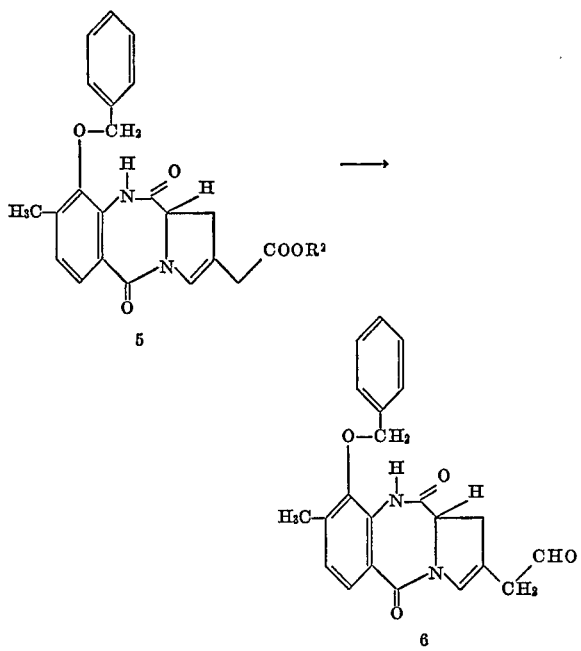

Compound 5 is reduced by allowing it to react with diisobutylaluminum hydride for about 1 hour at temperatures of from about —50° to about —70° C. The resulting product is unstable and is consequently reacted in situ to form a mixture of epimeric cyanohydrins according to the following reaction G:

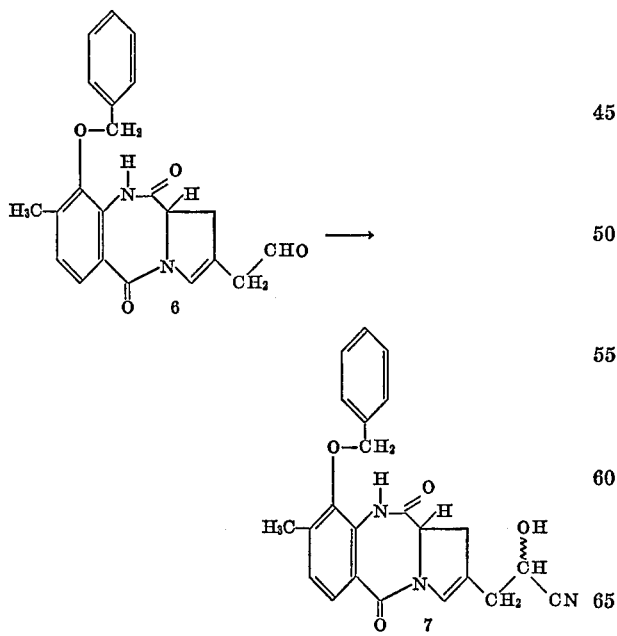

The reaction is effected with an alkali metal cyanide, e.g., potassium cyanide at room temperature, e.g., about 20° C. to about 25° C. The reaction is run for a time sufficient to complete the reaction, e.g., about 1 hour.

Treatment of the product, resulting from reaction G, (11aS) - 9 - benzyloxy-5,10,11,11a-tetrahydro-α-hydroxy-8 - methyl - 5,11 - dioxo-1H-pyrrolo[2,1-c][1,4]benzodiazepine-2-propionitrile, with methanesulfonyl chloride according to the following reaction H:

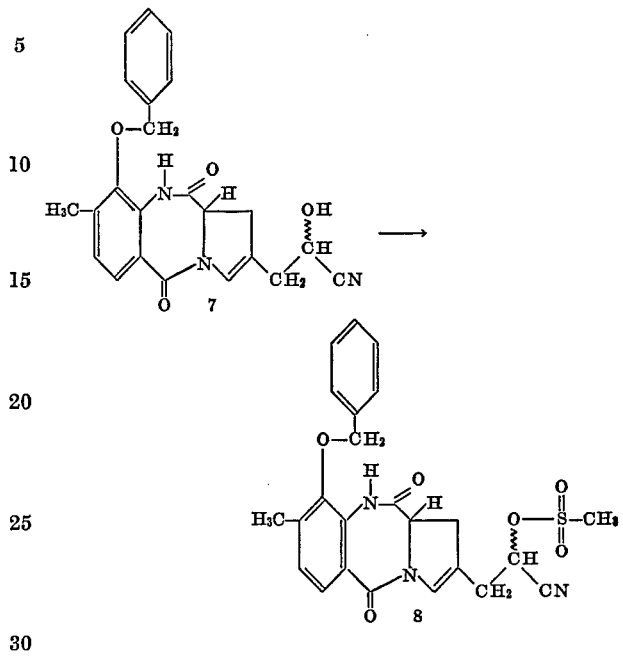

results in a mixture of epimeric mesylates. This reaction can be carried out at temperatures of about 0° C. to about 5° C. for a time sufficient to complete the reaction, e.g. about 18 to 24 hours. The product (11aS)-9-benzyloxy-5,10,11,11a-tetrahydro - 8 - methyl-α-methylsulfonyloxy-5,11-dioxo - 1H - pyrrolo[2,1-c][1,4]benzodiazepine-2-propionitrile is then subsequently treated with an organic base, in an organic solvent according to the following reaction I:

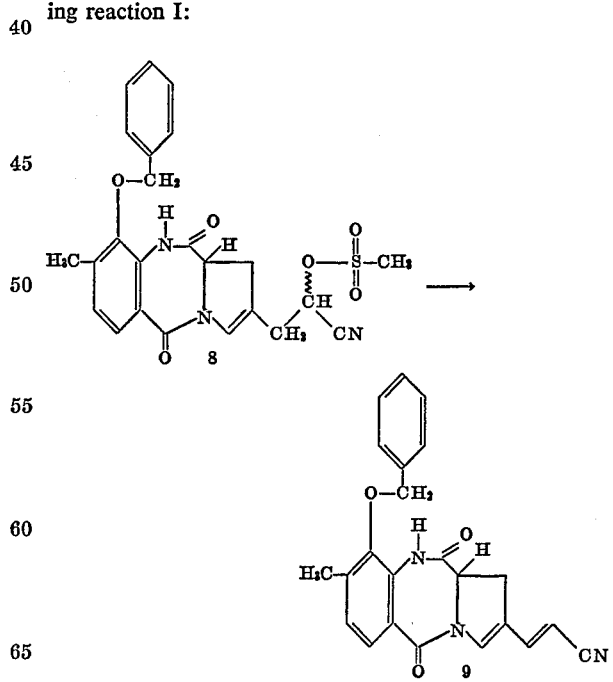

This reaction is carried out at reflux under an inert atmosphere for about 10 to 15 hours.

The product, a mixture of trans-cis isomers of (11aS)-9-benzyloxy - 5,10,11,11a - tetrahydro - 8 - methyl-5,11-dioxo - 1H - pyrrolo[2,1-c][1,4]benzodiazepine-2-acrylonitrile, can be subsequently separated into its cis and trans isomers by preparative thin layer chromatography (TLC) (silica gel plates developed in ether).

The product from reaction I (the cis-trans mixture) is subsequently reacted with trifluoroacetic acid at room temperature according to reaction J

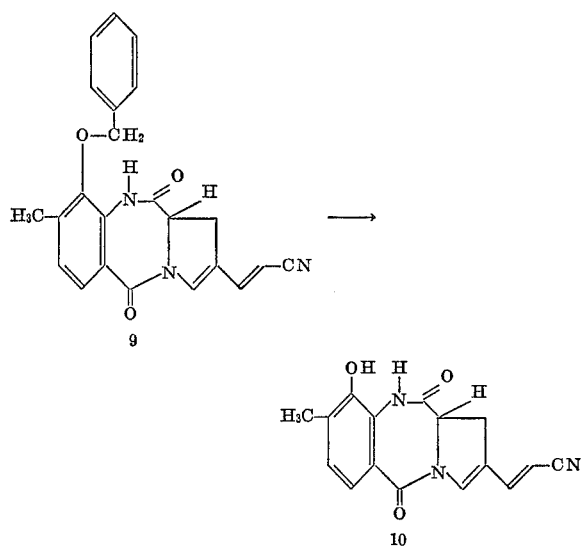

The resulting product (11aS)-5,10,11,11a-tetrahydro-9-hydroxy - 8 - methyl-5,11-dioxo-1H-pyrrolo[2,1-c][1,4] benzodiazepine-2-acrylonitrile, is recovered as a cis-trans mixture. The cis-trans mixture can be reacted with boiling aqueous trifluoroacetic acid according to reaction K

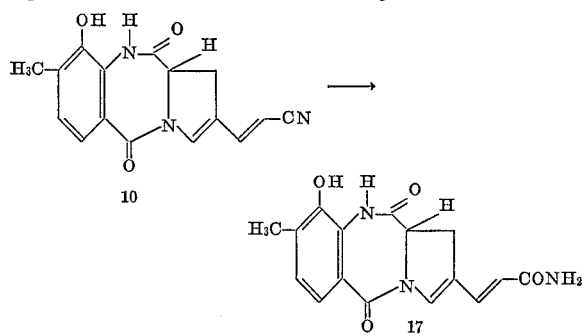

This reaction is carried out at reflux under an inert atmosphere for about 5 to 10 hours. The resulting product, (11aS) - 5,10,11,11a - tetrahydro-9-hydroxy-8-methyl-5,11-dioxo - 1H - pyrrolo[2,1-c][1,4]benzodiazepine-2-trans-acrylamide is recovered and converted into the O-benzoyl derivative according to the following reaction L

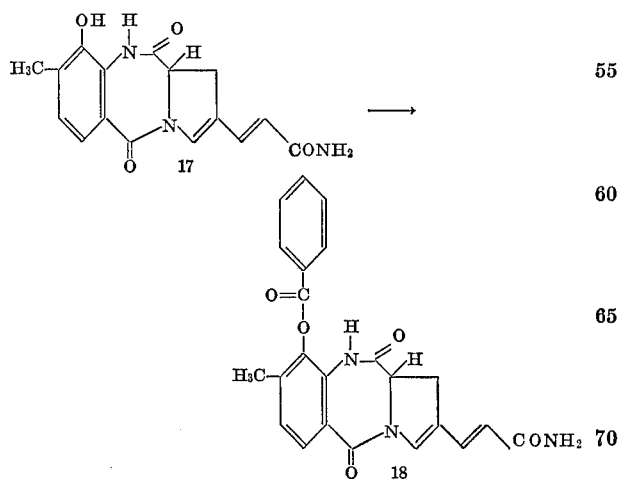

This reaction is carried out by treating the product of reaction K with benzoic anhydride in the presence of triethylamine at elevated temperatures, e.g. about 45° C. to about 60° C. for about 2 to 3 hours. The resulting product, (11aS)-9-benzoyloxy - 5,10,11,11a - tetrahydro-8-methyl - 5,11 - dioxo - 1H - pyrrolo[2,1-c][1,4]benzodiazepine-2-trans-acrylamide is recovered.

The product from reaction L is subsequently converted to the trans nitrile according to the following reaction M

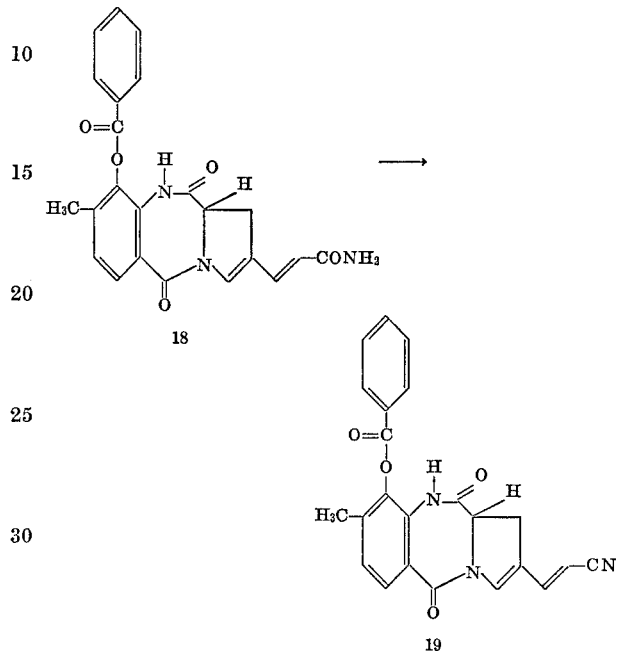

This reaction is effected by reacting the product of reaction L with p-toluenesulfonyl chloride and pyridine at elevated temperatures, e.g., about 45° C. to about 60° C. for a time sufficient to complete the reatcion, e.g. about 1 to 2 hours. The product, (11aS)-9-benzoyloxy-5,10,11,11a - tetrahydro - 8 - methyl-5,11-dioxo-1H-pyrrolo[2,1-c][1,4]benzodiazepine - 2 - trans-acrylonitrile is recovered.

The product from reaction M is subsequently converted to the trans isomer of the product of reaction J according to the following reaction N

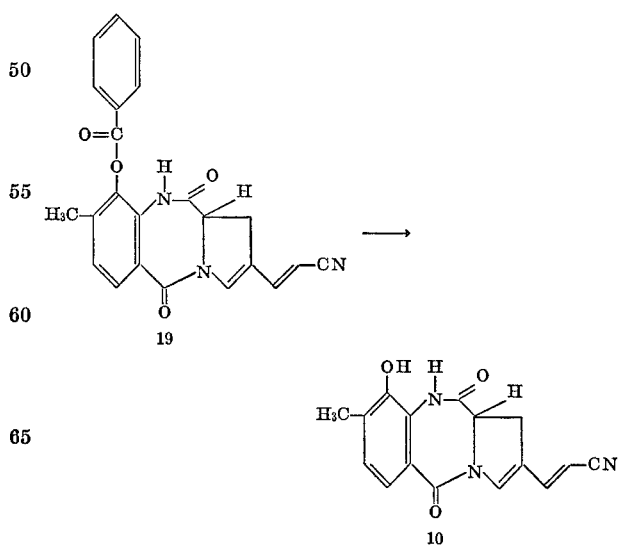

This reaction is effected by heating the compound in methanol at reflux in the presence of a catalytic amount of triethylamine for from about 1 to about 2 hours.

The resulting compound, either as a mixture of the cis and trans isomers as produced in reaction J or as the trans isomer as produced in reaction N, is reacted according to reaction O

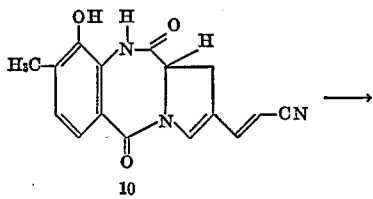

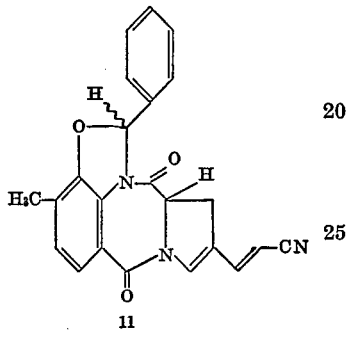

This reaction is effected with benzaldehyde dimethylacetal at elevated temperatures, e.g., about 185° C. to about 210° C. under an inert atmosphere for about 1 to 2 hours.

The resulting product, (10aS)-6,10,10a,11-tetrahydro-3 - methyl-6,11-dioxo-1-phenyl-1H-oxazolo[5,4,3-jk]pyrrolo[2,1-c][1,4]benzodiazepine - 9 - trans - acrylonitrile is recovered and subsequently converted to the trans amide according to the following reaction P

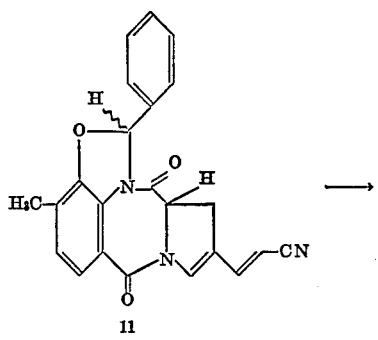

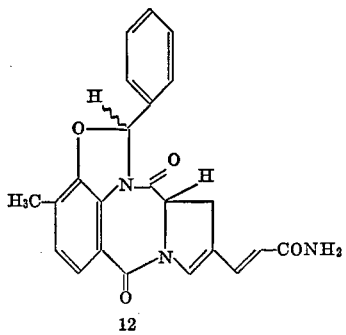

This reaction is effected by utilizing hot (95° C.) polyphosphoric acid. The reaction is run until completion, i.e. about 20 to 45 minutes and the trans amide is obtained. The resulting yellow crystalline product is subsequently reduced according to the following reaction Q

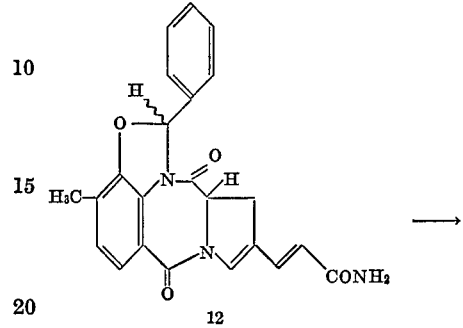

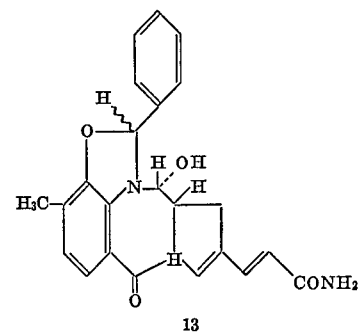

This reduction is carried out by either of two methods (a) with lithium aluminum hydride in tetrahydrofuran at about —50° C. or (b) with sodium borohydride in methanol at about 5° C. The latter is the preferred method. The resulting compound (10aS,11R)6,10,10a,11-tetrahydro-11-hydroxy-3-methyl - 6 - oxo - 1 - phenyl-1H - oxazolo[5,4,3 - jk]pyrrolo[2,1 - c][1,4]benzodiazepine-9-trans-acrylamide is recovered.

This product is then reacted according to the following reaction R

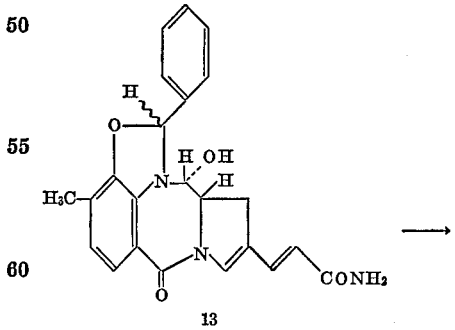

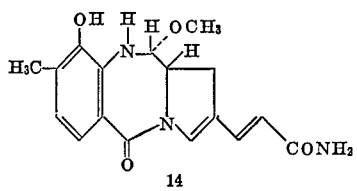

The reaction is effected with methanolic hydrochloric acid at room temperature, about 20° C. to about 25° C., for a time sufficient to complete the reaction, e.g. about 18 to 24 hours.

13

The resulting product, which is the compound represented by formula I wherein R is methyl, is recovered, and by analytical and microbiological testing, proved to be identical to the known compound 14.

The compound 14 can be converted to the dihydroxy compound, compound 16, by elimination of methanol to form compound 15 and subsequent hydration according to the following reaction S Compound 14 can also be degraded and reformed according to reactions T, U, V and W as follows:

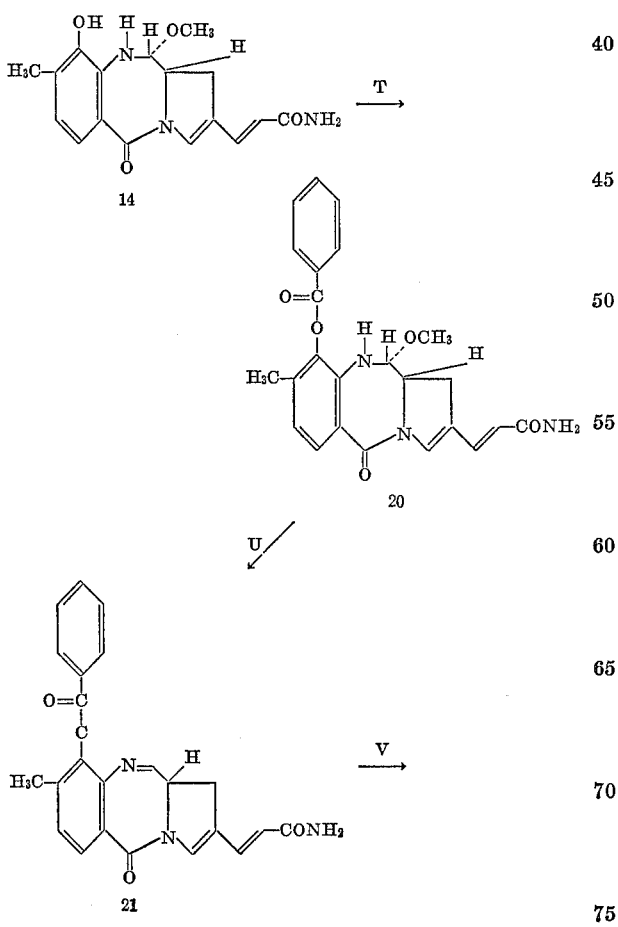

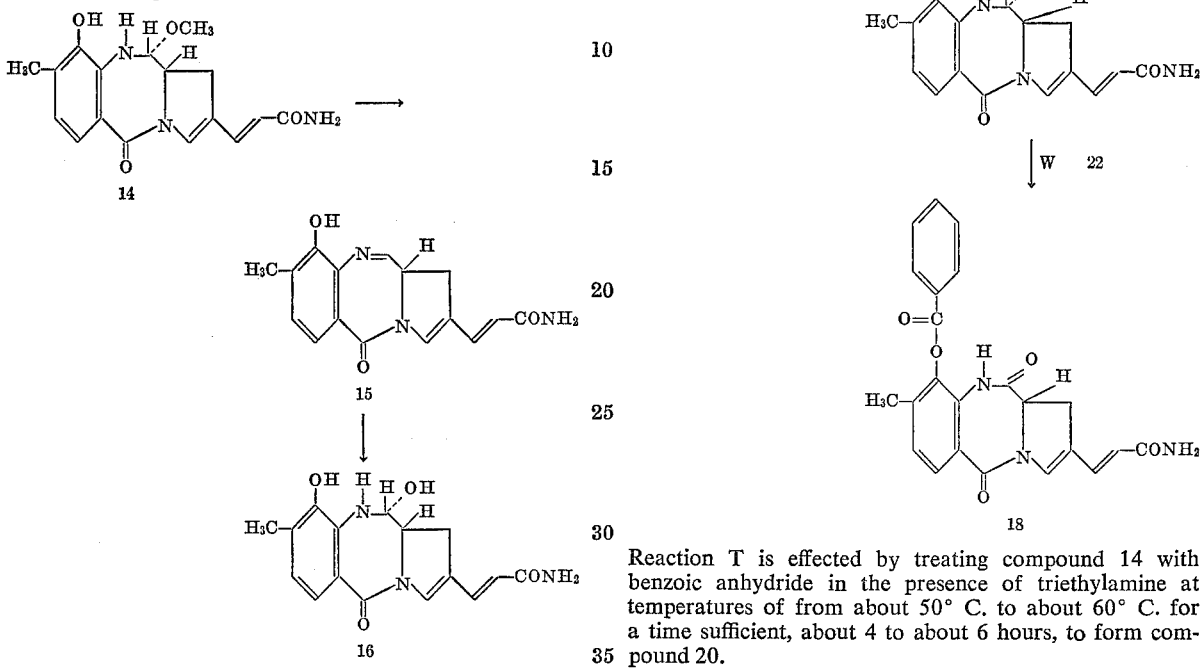

14

Reaction T is effected by treating compound 14 with benzoic anhydride in the presence of triethylamine at temperatures of from about 50° C. to about 60° C. for a time sufficient, about 4 to about 6 hours, to form compound 20.

Reaction U is effected by treating compound 20 with isopropenylacetate in the presence of a catalytic amount of acetic acid at reflux temperature for a time sufficient to complete the reaction, e.g. about 25 to 35 hours.

Reaction V is effected by hydration of compound 21 to form compound 22 utilizing water at room temperature.

Reaction W is effected by oxidizing compound 22 with manganese dioxide, chromium trioxide in pyridine, or peracids at room temperature, e.g. from about 20° C. to about 25° C. for a time sufficient to complete the reaction, e.g. about 8 to 12 hours, to form compound 18.

Subsequently, compound 18 is treated according to reaction M as previously described, and eventually compounds 14 and 16 are derived by reactions N, O, P, Q, R and S as previously described.

The following examples illustrate the invention; all temperatures are in ° C.

Example 1.—1-(3-benzyloxy-2-nitro-p-toluoyl)-L-(4-hydroxyproline) methyl ester 11 ml. (150 mmoles) of thionyl chloride (distilled) is added dropwise, over a five minute period, to a stirred solution of 14.35 g. (50 mmoles) of 3-benzyloxy-2-nitro-p-toluic acid and 1.4 ml. of pyridine in 280 ml. of chloroform (purified over silica gel) contained in a 500 ml. roundbottom flask fitted with reflux condenser and calcium chloride tube. The solution is then heated at reflux for thirty minutes, and subsequently taken to dryness on a rotary evaporator under aspirator pressure. Removal of any remaining thionyl chloride is ensured by consecutive addition and removal of two 200 ml. portions of benzene on the rotary evaporator.

The residue is then taken up in 130 ml. of methylene chloride and added dropwise at room temperature (over 10 min.) to a stirred solution of 10.00 g. (55 mmoles) of L-4-hydroxyproline methyl ester hydrochloride and 25 ml. (180 mmoles) of triethylamine in 130 ml. of methylene chloride. After 30 minutes, the reaction mixture is poured into a separatory funnel and extracted in a counter-current manner (4 funnels) with 2× 100 ml. of 1 N phosphoric acid, 1× 100 ml. of saturated sodium bicarbonate, and 1× 100 ml. of water followed by 3× 100 ml. methylene chloride washes of the aqueous phases. The organic phases are then combined, dried over anhydrous sodium sulfate, filtered, and taken to dryness by means of a rotary evaporator to give a slightly pinkish solid. The color is then removed by passing a methylene chloride solution of the product through a column of 20 g. of neutral alumina (activity III). Recrystallization from methylene chloride-ether affords white crystals of 1-(3-benzyloxy-2-nitro-p-toluoyl)-L-(4-hydroxyproline) methyl ester, M.P. 160–162° (vac.), $[\alpha]_D^{25}$ −185° (c. 1.0, MeOH).

*Analysis.*—Calcd. for $C_{21}H_{22}N_2O_7$ (percent): C, 60.86; H, 5.35; N, 6.76. Found (percent): C, 60.68; H, 5.38; N, 7.07.

Example 2.—1-(3-benzyloxy-2-amino-p-toluoyl)-L-(4-hydroxyproline) methyl ester hydrobromide A solution of 10.4 g. (25 mmoles) of 1-(3-benzyloxy-2-nitro-p-toluoyl)-L-(4-hydroxyproline)methyl ester in 150 ml. of tetrahydrofuran is added dropwise to a stirred solution of 30.5 g. (175 mmoles) of sodium dithionite in 300 ml. of water and 150 ml. of tetrahydrofuran which had been preheated to 40°. The addition is carried out over a period of 30 min. and the temperature maintained at 40°. After an additional 15 min., the reaction mixture is concentrated by means of a rotary evaporator (bath temperature 35°) and then extracted with 6× 150 ml. of ethyl acetate. The combined extracts are then washed with 2× 100 ml. of water and taken to dryness. The residue is dissolved in 450 ml. of methylene chloride and the solution saturated with hydrogen bromide gas at 5–10°. The resulting precipitate is filtered and thoroughly washed with methylene chloride. Crystallization from methanol-ether at room temperature yields 1-(3-benzyloxy-2-amino-p-toluoyl) - L - (4 - hydroxyproline)methyl ester hydrobromide, M.P. 157–159°. Treatment of a methanolic solution of the product with charcoal and crystallization from methanol-ether affords an analytical sample, M.P. 158.5–159°, $[\alpha]_D^{25}$ −81° (c. 1.12, DMSO).

*Analysis.*—Calcd. for $C_{21}H_{24}N_2O_5 \cdot HBr$ (percent): C, 54.20; H, 5.42; N, 6.02. Found (percent): C, 54.28; H, 5.68; N, 6.05.

Example 3.—(2R,11aS) - 9 - benzyloxy - 1,2,3,11a - tetrahydro - 2 - hydroxy - 8 - methyl - 5H - pyrrolo[2,1 - c]- [1,4]benzodiazapine-5,11(10H)-dione (a) 250 ml. of tetrahydrofuran and 1 l. of water are added to a stirred suspension of 165.8 g. (0.400 mole) of 1-(3-benzyloxy-2-nitro - p - toluoyl)-L-(4-hydroxyproline)methyl ester in 1.2 l. of ethyl acetate at 50° in a 5 l. three-neck flask fitted with nitrogen inlet, reflux condenser, and immersed thermometer. 416.6 g. (2.4 moles) of sodium dithionite in increments are then added over a 30 minute interval to the resulting clear two phase mixture maintained at 50° during which time the reaction mixture becomes dark orange and gradually fades to light yellow. After 45 min. an additional 500 ml. of water, 454 g. (2.6 moles) of sodium dithionite, and 500 ml. of methanol are added. The reaction mixture is maintained at 50° for a total of 5½ hrs., and allowed to cool overnight. The organic phase is then separated and washed with 500 ml. of water. The aqueous phases are then extracted in a counter-current manner with 3× 1 l. of chloroform, the organic phases combined, and the solvents removed on a rotary evaporator. Since the residue still contains about 20–30% starting material, it is redissolved in 1 l. of ethyl acetate, 1.5 l. of water, and 500 ml. of methanol at 50° and 100 g. (0.57 mole) of sodium dithionite is then added in increments over 30 min. The reaction mixture is then allowed to cool to room temperature and the organic phase separated and washed with water. The aqueous phases are then extracted in a counter-current manner with 1. l. of ethyl acetate and 6× 1 l. of chloroform to give, after drying over sodium sulfate, filtration, and removal of the solvents on a rotary evaporator, crude 1-(3-benzyloxy-2-amino-p-toluoyl)-L-(4-hydroxyproline)methyl ester.

(b) A stirred solution of the crude product in 2 l. of xylene is heated at reflux overnight in a nitrogen atmosphere. The reaction mixture is cooled in an ice bath and filtered. The crystals are then washed successively with 50 ml. of benzene, 50 ml. of methanol, and 50 ml. of ether. They are dissolved in 5 l. of methanol, treated with charcoal, filtered, and allowed to crystallize to give white crystals, M.P. 243–243.5° (vac.). Concentration of the filtrate to 500 ml. gives a second crop, M.P. 241–243° (vac.). The resulting product is (2R,11aS)-9-benzyloxy-1,2,3,11a - tetrahydro - 2 - hydroxy - 8 - methyl - 5H-pyrrolo[2,1-c][1,4]benzodiazepine - 5,11(10H) - dione, $[\alpha]_D^{25}$ +259° (c. 0.445, MeOH).

*Analysis.*—Calcd. for $C_{20}H_{20}N_2O_4$ (percent): C, 68.17; H, 5.72; N, 7.95. Found (percent): C, 68.18; H, 6.03; N, 7.83.

Example 4.—(11aS) - 9 - benzyloxy - 8 - methyl - 1H-pyrrolo[2,1 - c][1,4]benzodiazepine - 2,5,11(3H,10H, 11aH)-trione 100 ml. of Jones reagent (8 N chromic acid) [2] is added over a 5 min. period to a stirred solution of 20.0 g. (56.8 mmoles) of (2R,11aS)-9-benzyloxy-1,2,3,11a-tetrahydro-2 - hydroxy - 8 - methyl - 5H - pyrrolo[2, - c][1,4-benzodiazepine-5,11(10H)-dione in 10 l. of acetone. After 2 hrs. 100 ml. of methanol is added and stirred for an additional 15 min. The reaction mixture is then filtered through diatomaceous earth and the filtrate taken to dryness by means of a rotary evaporator. The residue is dissolved in 2 l. of ethyl acetate, extracted with 2× 1 l. of 2 N aqueous sodium carbonate and washed with 2× 1 l. of water. The aqueous phases are then backwashed with a total of 2 l. of ethyl acetate, the organic phases combined and dried over sodium sulfate. The filtered solution is then taken to dryness, the residue dissolved in methylene chloride and treated with charcoal. Crystallization from methylene chloride-ether affords (11aS)-9-benzyloxy - 8 - methyl - 1H - pyrrolo[2,1-c][1,4]benzodiazepine-2,5,11(3H,10H,11aH) - trione, M.P. 180–182° (vac.). This compound exists in two isomorphic forms, prisms, M.P. 180–182° (vac.) and needles, M.P. 160–161° (vac.). The latter upon analysis shows M.P. 160–161.5° (vac.), $[\alpha]_D^{25}$ +320° (c. 1.03, MeOH).

*Analysis.*—Calcd. for $C_{20}H_{18}N_2O_4$ (percent): C, 68.56; H, 5.18; N, 8.00. Found (percent): C, 68.34; H, 4.87; N, 7.83.

[2] K. Bowden, I. M. Heilbron, E. R. H. Jones, and B. C. L. Weedon, J. Chem. Soc. p. 39 (1946).

Example 5.—(11aS) - 9 - benzyloxy - 5,10,11,11a - tetrahydro - 8 - methyl - 5,11 - dioxo - 1H - pyrrolo[2,1-c]- [1,4]benzodiazepine-2-acetic acid ethyl ester A solution of 10.1 g. (44 mmoles) of triethylphosphonoacetate in 50 ml. of dry tetrahydrofuran is added dropwise over 15 minutes, with the temperature maintained at 20° to a stirred slurry of 2.0 g. (44 mmoles) of a 53% dispersion of sodium hydride in mineral oil and 30 ml. of dry tetrahydrofuran (freshly distilled from lithium aluminum hydride) under nitrogen. The reaction mixture is stirred at room temperature for 1 hour, then cooled to 10°, and a solution of 10.5 g. (30 mmoles) of (11aS) - 9 - benzyloxy - 8 - methyl - 1H - pyrrolo[2,1-c]- [1,4]benzodiazepine-2,5,11(3H,10H,11aH)-trione in 120 ml. of dry tetrahydrofuran added dropwise over a period of 30 minutes. The cooling bath is removed and after 1 hour the reaction mixture quenched with 20 ml. of acetone. The solvents are removed on a rotary evaporator and the residue equilibrated between 600 ml. of water and 600 ml. of methylene chloride. The organic phase is then washed with 2× 600 ml. of water and the aqueous phases back-extracted in a counter-current manner with 2× 600 ml. of methylene chloride. The combined ortrans-acrylamide as white crystals, M.P. 323–324° (dec., vac.), [α]$_D^{25}$+850° (c. 0.102, DMSO).

Example 9.—(11aS) - 9 - benzolyloxy - 5,10,11,11a-tetrahydro - 8 - methyl-5,11-dioxo-1H-pyrrolo[2,1-c][1,4]benzodiazepine-2-trans-acrylamide 1.0 g. (3.2 mmoles) of (11aS)-5,10,11,11a-tetrahydro-9 - hydroxy - 8-methyl-5,11-dioxo-1H-pyrrolo[2,1-c][1,4]benzodiazepine-2-trans-acrylamide is added to a stirred solution of 5.40 g. (24 mmoles) of pure benzoic anhydride in 100 ml. of distilled triethylamine and 100 ml. of N,N-dimethylformamide (distilled from barium oxide) at 50°. The resulting solution is kept at 50–55° for 2¾ hours and then the reaction mixture taken to dryness at 40–45° under high vacuum. Upon addition of 300 ml. of ether to the yellow liquid residue, the product precipitates. The suspension is stirred at room temperature for 30 minutes, the product filtered and dried in vacuo at room temperature, affording crude (11aS)-9-benzoyloxy-5,10,11,11a-tetrahydro - 8 - methyl-5,11-dioxo-1H-pyrrolo[2,1-c][1,4]benzodiazepine-2-trans-acrylamide.

Example 10.—(11aS)-9-benzoyloxy - 5,10,11,11a-tetrahydro-8-methyl - 5,11 - dioxo-1H-pyrrolo[2,1-c][1,4]benzodiazepine-2-trans-acrylonitrile A mixture consisting of 5.32 g. (28 mmoles) of p-toluenesulfonyl chloride and 2.92 g. (7.3 mmoles) of (11aS) - 9 - benzoyloxy-5,10,11,11a-tetrahydro-8-methyl-5,11 - dioxo - 1H-pyrrolo[2,1-c][1,4]benzodiazepine-2-trans-acrylamide is dissolved in 120 ml. of pyridine and the solution stirred at 50–55° for 90 min. The solvent is then removed under reduced pressure at 40–45° and the remaining brown residue stirred with 200 ml. of ether for 30 min. The suspension is then filtered, the filtrate discarded, and the solids chromatographed on 170 g. of magnesia-silica gel (Florisil). Fractions obtained by elution with a mixture of methylene chloride-ethyl acetate (9:1 v./v.) contain, according to TLC-analysis, the desired product. Crystallization of these fractions from methylene chloride-ether affords (11aS)-9-benzoyloxy-5,10,11,11a - tetrahydro - 8-methyl - 5,11-dioxo-1H-pyrrolo[2,1-c][1,4]benzodiazepine - 2-trans-acrylonitrile as white crystals which are pure according to TLC. Analysis shows M.P. 295–296° (vac.), [α]$_D^{25}$+676° (c. 0.97, DMSO).

*Analysis.*—Calc'd for C$_{23}$H$_{17}$N$_3$O$_4$ (percent): C, 69.16; H, 4.29; N, 10.52. Found (percent): C, 69.08; H, 4.54; N, 10.80.

Example 11.—(11aS)-9-hydroxy - 5,10,11,11a-tetrahydro-8-methyl - 5,11 - dioxo-1H-pyrrolo[2,1-c][1,4]benzodiazepine-2-trans-acrylonitrile A mixture consisting of 6.82 g. (17.1 mmoles) of (11aS) - 9 - benzoyloxy-5,10,11,11a-tetrahydro-8-methyl-5,11-dioxo-1H-pyrrolo[2,1-c][1,4]benzodiazepine-2-trans-acrylonitrile, 2 l. of methanol, and 2 ml. of triethylamine is refluxed on a steambath for 1¾ hours. The resulting yellow solution is then cooled to room temperature and concentrated by means of a rotary evaporator to 250 ml. whereupon crystallization occurs. After cooling for 3½ hours at 0°, the crystals are filtered and washed with cold methanol, followed by ether. Crystallization from acetone-benzene gives a first crop of pure product, M.P. 275–276° (vac., dec.) A second crop is obtained by evaporating the filtrate of the reaction mixture to dryness under high vacuum at 65°. The yellow residue is then digested with 200 ml. of petroleum ether, filtered, the solids combined with the mother liquor of the first crop and crystallized from acetone-benzene.a (11aS) - 9-hydroxy-5,10,11,11a-tetrahydro - 8 - methyl-5,11-dioxo-1H-pyrrolo[2,1-c][1,4]benzodiazepine-2-trans-acrylonitrile is obtained. Analysis shows M.P. 275–276° (vac. dec.), [α]$_D^{25}$+851° (c. 0.66, DMSO).

*Analysis.*—Calc'd for C$_{16}$H$_{13}$N$_3$O$_3$ (percent): C, 65.08; H, 4.44; N, 14.23. Found (percent): C, 65.12; H, 4.47; N, 13.97.

Example 12.—(10aS) - 6,10,10a,11-tetrahydro-3-methyl-6,11 - dioxo - 1-phenyl-1H-oxazolo-[5,4,3-jk]pyrrolo[2,1-c][1,4]benzodiazepine-9-trans-acrylonitrile A mixture of 4.0 g. (13.5 mmoles) of (11aS)-9-hydroxy - 5,10,11,11a - tetrahydro - 8-methyl-5,11-dioxo-1H-pyrrolo[2,1-c][1,4]benzodiazepine - 2 - trans-acrylonitrile and 500 ml. of freshly distilled benzaldehyde dimethylacetal is stirred at 190° to 210° for 95 minutes in a nitrogen atmosphere. The resulting solution is then concentrated on a rotary evaporator at 130–135° under reduced pressure (30 mm. Hg) to about 75 ml. whereupon formation of some crystalline material is observed. After cooling, 237 mg. of this material is collected and discarded. The remaining solution is then evaporated to complete dryness unnder high vacuum at 110–115° and the residue chromatographed on 156 g. of neutral alumina (activity I). Fractions which are obtained by eluting with methylene chloride contain, according to TLC-analysis, the desired product. Crystallization of individual fractions from ether affords pure product which melts in the range of 191–196° (vac.). The mother liquors when rechromatographed under similar conditions, give two additional crops, M.P. 194–196° (vac.) and M.P. 193–195° (vac.). Thus, (11aS)-6,10,10a,11-tetrahydro-3-methyl-611-dioxo-1-phenyl - 1H - oxazolo[5,4,3-jk]pyrrolo[2,1-c][1,4]benzodiazepine - 9 - trans-acrylonitrile is obtained. Analysis shows M.P. 194–195° (vac.), [α]$_D^{25}$+951° (c. 0.65, DMSO).

*Analysis.*—Calc'd for C$_{23}$H$_{17}$N$_3$O$_3$ (percent): C, 72.05; H, 4.47; N, 10.96. Found (percent): C, 72.13; H, 4.52; N, 10.83.

Example 13.—(10aS) - 6,10,10a,11 - tetrahydro-3-methyl-6,11 - dioxo - 1 - phenyl - 1H - oxazolo[5,4,3-jk]pyrrolo[2,1-c][1,4]benzodiazepine-9-trans-acrylamide 1.0 g. (2.61 mmoles) of (10aS)-6,10,10a-11-tetrahydro-3 - methyl - 6,11 - dioxo - 1 - phenyl - 1H - oxazolo[5,4,3-jk]pyrrolo[2,1 - c][1,4]benzodiazepine - 5 - trans-acrylonitrile in form of a fine powder is added under stirring to 100 g. of polyphosphoric acid which had been preheated to 95°. After 35 min., the resulting yellow-brown solution is cooled to room temperature and 680 ml. of a mixture of ice and water is added. After stirring for 40 min. at room temperature, a yellow turbid solution is obtained which is then extracted with 3× 500 ml. of ethyl acetate. The extracts are then washed with 3× 300 ml. of water, 5× 300 ml. of cold 1 N sodium hydroxide and finally again with 9× 300 ml. of water. The solutions are then combined, dried over sodium sulfate, filtered, and evaporated to dryness under reduced pressure. Crystallization of the residue from acetone affords (10aS)-6,10,10a,11 - tetrahydro - 3 - methyl - 6,11 - dioxo - 1 - phenyl-1H - oxazolo[5,4,3 - jk]pyrrolo[2,1 - c][1,4]benzodiazepine-9-trans-acrylamide in two crops of slightly yellow crystals, M.P. 281–282° (vac., dec.), [α]$_D^{25}$+870° (c. 0.725, DMSO).

*Analysis.*—Calc'd for C$_{23}$H$_{19}$N$_3$O$_4$ (percent): C, 68.81; H, 4.77; N, 10.47. Found (percent): C, 68.56; H, 4.76; N, 10.45.

Example 14.—(11R,11aS)5,10,11,11a-tetrahydro-9,11-dihydroxy - 8 - methyl - 5 - oxo - 1H - pyrrolo[2,1-c][1,4]benzodiazepine-2-trans-acrylamide by use of sodium borohydride (a) A hot solution of 200 mg. (0.50 mmole) of (10aS)-6,10,10a,11 - tetrahydro - 3 - methyl - 6,11 - dioxo - 1-phenyl - 1H - oxazolo[5,4,3 - jk]pyrrolo[2,1 - c][1,4]benzodiazepine-9-trans-acrylamide in 25 ml. of methanol is cooled to 3° and, with stirring, 95 mg. (2.5 mmoles) of sodium borohydride added. The resulting solution is kept at 3–5° for 2½ hours after which 200 ml. of ethyl acetate and 100 ml. of water are added. The organic phase is then separated and washed with 2× 200 ml. of water. The remaining aqueous phases are backwashed with 4× 200 ml. of ethyl acetate. The combined ethyl acetate soluganic phases are then dried over magnesium sulfate, filtered, and evaporated to giev a material which is dissolved in 50 ml. of benzene and applied to a column of 210 g. of magnesia-silica gel (Florisil) prepared in benzene. Elution with benzene followed by ether gives solids which on crystallization from ether, yields partially racemized (11aS) - 9 - benzyloxy - 5,10,11,11a - tetrahydro-8 - methyl - 5,11 - dioxo - 1H - pyrrolo[2,1 - c][1,4]-benzodiazepine-2-acetic acid ethyl ester as white crystals, $[\alpha]_D^{25}+275°$ (c. 0.9, $CHCl_3$). Analytically pure material, M.P. 152.5–153° (vac.), $[\alpha]_D^{25}+373°$ (c. 0.78, $CHCl_3$) is obtained by repeated chromatography on neutral alumina (activity III) and recrystallization from ethanol.

*Analysis.*—Calc'd for $C_{24}H_{24}N_2O_5$ (percent): C, 68.56; H, 5.75; N, 6.66. Found (percent): C, 69.03; H, 5.61; N, 6.80.

Example 6.—Trans and cis (11aS)-9-benzyloxy-5,10,11,-11a-tetrahydro-8-methyl - 5,11 - dioxo-1H-pyrrolo[2,1-c][1,4]benzodiazepine-2-acrylonitrile (a) A stirred solution of 4.205 g. (10.0 mmoles) of (11aS)-9-benzyloxy - 5,10,11,11a - tetrahydro - 8-methyl-5,11 - dioxo - 1H - pyrrolo[2,1-c][1,4]benzodiazepine-2-acetic acid ethyl ester in 1.8 l. of toluene under nitrogen is heated to boiling in order to distill off 100 ml. of the solvent and is then cooled to −70° with a Dry Ice-acetone bath. Over a period of 10 min., 26 ml. of a 1.5 N solution (39 mmoles) of diisobutylaluminum hydride in toluene is added dropwise. The reaction mixture is maintained at −60° for 1 hour, and then quenched with 10 ml. of methanol. The cooling bath is removed, and after 10 min. a solution of 10.4 g. (100 mmoles) of sodium bisulfite in 20 ml. of water added, followed by a solution of 6.5 g. (100 mmoles) of potassium cyanide in 20 ml. of water. After 1 hour, the resulting colorless three phase reaction mixture is transferred to a separatory funnel with the aid of about 300 ml. of water. The toluene phase is separated in such a manner that the suspended solids are left with the aqueous phase, then washed with 100 ml. of water, dried over anhydrous sodium sulfate, filtered, and evaporated on a rotary evaporator to give an amorphous material. On attempted extraction of the aqueous suspension with 400 ml. of chloroform, an emulsion forms which is filtered through a coarse sintered glass funnel. The filtrate is readily separated and the chloroform phase washed with 100 ml. of water. The aqueous phases are then extracted in a counter-current manner with 3× 400 ml. of chloroform. The combined chloroform phases are dried over anhydrous sodium sulfate, filtered, and the solvent removed on a rotary evaporator to give an amorphous material. The residue which is obtained upon filtration of the emulsion is dried overnight in vacuo over anhydrous calcium sulfate and then successively extracted with 2× 50 ml. of boiling chloroform and 2× 50 ml. of boiling chloroform-methanol (1:1 v./v.). Evaporation of the combined organic phases gives a white solid. The Three isolated fractions are combined to give crude (11aS)-9-benzyloxy - 5,10,11,11a - tetrahydro-α-hydroxy-8-methyl - 5,11 - dioxo-1H-pyrrolo[2,1-c][1,4]benzodiazepine-2-propionitrile (mixture of epimers).

(b) 3.436 g. (30 mmoles) of distilled methanesulfonyl chloride followed by 25 ml. of pyridine (distilled from barium oxide) are added to the crude product from part (a) cooled in an ice bath. The reaction mixture is left in the refrigerator (5°) for 18 hours, then poured into 200 ml. of 2 M phosphoric acid at 0°, and extracted with 100 ml. of methylene chloride. The extract is washed successively with 100 ml. of water and 100 ml. of 0.5 N sodium bicarbonate. The aqueous phases are extracted in a counter-current manner with 2× 100 ml. of methylene chloride. The organic phases are combined, dried over anhydrous sodium sulfate, filtered and the solvent evaporated to give an amorphous material which is chromatographed on 120 g. of silica gel. Elution with benzene-ethyl acetate (4:1 to 1:1 v./v.) gives crude (11aS)-9-benzyloxy-5,10,11,11a-tetrahydro - 8 - methyl-α-methylsulfonyloxy-5,11-dioxo - 1H - pyrrolo[2,1-c][1,4]benzodiazepine-2-propionitrile (mixture of epimers).

(c) A solution of the product of part (b) in 100 ml. of benzene is heated for 11 hours at reflux under nitrogen with 10 ml. (72 mmoles) of triethylamine (distilled from phenyl isocyanate). The solvent and excess triethylamine are removed on a rotary evaporator. The residue is taken up in 100 ml. of methylene chloride, and washed successively with 100 ml. of 0.5 M phosphoric acid at 0°, 100 ml. of water, and 100 ml. of 0.5 N sodium bicarbonate. The aqueous phases are then extracted in a counter-current manner with 2× 100 ml. of methylene chloride. The organic phases are then combined, dried over anhydrous sodium sulfate, filtered, and evaporated to give a yellowish solid which is chromatographed on 75 g. of silica gel. Elution with benzeneethyl acetate (4:1 to 1:1 v./v.) affords a 4:1 mixture of trans-cisisomers of (11aS)-9-benzyloxy - 5,10,11,11a - tetrahydro-8-methyl-5,11-dioxo - 1H - pyrrolo[2,1-c][1,4]benzodiazepine-2-acryloni-trile, M.P. 179–198° (vac.).

The cis and trans isomers are separated by preparative TLC (silica gel plates developed in ether) and crystallized from methylene chloride-hexane to give the following: (11aS)-9-benzyloxy - 5,10,11,11a - tetrahydro-8-methyl-5,11-dioxo - 1H - pyrrolo[2,1-c][1,4]benzodiazepine-2-trans-acryonitrile hemihydrate, M.P. 203–205° (vac.), $[\alpha]_D^{25}+553°$ (c. 0.113, $CHCl_3$).

*Analysis.*—Calc'd for $C_{23}H_{19}N_3O_3 \cdot \frac{1}{2}H_2O$ (percent): C, 70.04; H, 5.11; N, 10.65. Found (percent): C, 70.19; H, 5.28; N, 10.68. And (11aS)-9-benzyloxy-5,10,11,11a-tetrahydro - 8 - methyl - 5,11 - dioxo-1H-pyrrolo[2,1-c]-[1,4]benzodiazepine-2-cis-acrylonitrile, M.P. 212–213° (vac.), $[\alpha]_D^{25}+597°$ (c. 0.102, $CHCl_3$).

*Analysis.*—Calc'd for $C_{23}H_{19}N_3O_3$ (percent): C, 71.67; H, 4.97; N, 10.90. Found (percent): C, 71.50; H, 4.77; N, 10.60.

Example 7.—(11aS) - 5,10,11,11a - tetrahydro-9-hydroxy-8-methyl - 5,11 - dioxo-1H-pyrrolo[2,1-c][1,4-benzodiazepine-2-acrylonitrile A solution of 1.00 g. (2.6 mmoles) of (11aS)-9-benzyloxy-5,10,11,11a-tetrahydro - 8 - methyl-5,11-dioxo-1H-pyrrolo[2,1-c][1,4]benzodiazepine - 2 - acrylonitrile (cis-trans mixture) in 25 ml. of trifluoroacetic acid containing 0.22 ml. of boron trifluoride etherate is kept at room temperature for 2.5 hours. The solvent is then removed on a rotary evaporator and the residue crystallized from 20 ml. of acetone to give slightly yellow crystals of (11aS)-5,10,11,11a-tetrahydro-9-hydroxy - 8 - methyl-5-11 - dioxo - 1H - pyrrolo[2,1-c][1,4]benzodiazepine-2-acrylonitrile.

Analysis of the hemi-hydrate shows the compound to have M.P. 265–266° (vac.), $[\alpha]_D^{25}+848°$ (c. 0.385, DMSO). NMR-analysis shows that this sample contains 80% of the trans-isomer and 20% of the cis-isomer.

*Analysis.*—Calc'd for $C_{16}H_{13}N_3O_3 \cdot \frac{1}{2}H_2O$ (percent): C, 63.15; H, 4.64; N, 13.81. Found (percent): C, 62.75; H, 4.57; N, 13.68.

Example 8.—(11aS) - 5,10,11,11a-tetrahydro-9-hydroxy-8-methyl-5,11-dioxo - 1H - pyrrolo[2,1-c][1,4]benzodiazepine-2-trans-acrylamide A solution of 240 mg. (0.813 mmole) of (11aS)-5,10,11,11a - tetraphydro - 9-hydroxy-8-methyl-5,11-dioxo-1H-pyrrolo[2,1 - c][1,4]benzodiazepine-2-acrylonitrile in 15 ml. of trifluoroacetic acid and 0.15 ml. (8.15 mmoles) of water is heated at reflux under a nitrogen atmosphere for 7 hours. The solvents are then removed on a rotary evaporator. The residue, which still contains about 50% of the starting material, is purified by preparative TLC [silica gel plates developed in chloroform-methanol (7:3)]. Several recrystallizations from methanol give pure (11aS) - 5,10,11,11a-tetrahydro-9-hydroxy-8-methyl-5,11 - dioxo - 1H - pyrrolo[2,1-c][1,4]benzodiazepine-2- tions are then dried over sodium sulfate, filtered and evaporated to dryness under reduced pressure at 25–30°, thus affording crude (10aS,11R)-6,10,10a,11-tetrahydro-11 - hydroxy - 3 - methyl - 6 - oxo - 1 - phenyl - 1H - oxazolo[5,4,3 - jk]pyrrolo[2,1 - c][1,4]benzodiazepine - 9 - transacrylamide.

(b) 65 ml. of 0.01 N hydrochloric acid is added to the product of part (a) dissolved in 130 ml. of methanol. After standing at room temperature for 20 hours, the reaction mixture is extracted with 5× 200 ml. of chloroform-n-butanol (3:1 v./v.). The organic phases, after being washed with 3× 200 ml. of water, are combined and evaporated to dryness at 30–35° under high vacuum. The yellow residue is then dissolved in 40 ml. of methanol and refluxed on a steambath for 30 min. Removal of the solvent gives 200 mg. of product which is dissolved in 10 ml. of methanol. After 5 ml. of water is added, the solution is stored at −20° for 40 hours whereupon crystallization occurs. The crystals are then filtered, washed with methanol-water (1:1 v./v.) and dried over calcium chloride in vacuo, thus affording the hydrate of compound 14 which decomposes above 120° in vacuo and melts undepressed in admixture with an authentic sample. Recrystallization from methanol-water (2:1 v./v.) gives analytically pure product, identical in all respects, including microbiological activity, with an authentic sample of the hydrate of the known compound 14.

Example 15.—(11R,11aS)5,10,11,11a-tetrahydro-9,11-dihydroxy - 8 - methyl - 5 - oxo - 1H - pyrrolo[2,1 - c][1,4]benzodiazepine - 2 - trans - acrylamide by use of lithium aluminum hydride (a) A solution of 200 mg. (0.50 mmole) of (10aS)-6,10,10a,11 - tetrahydro - 3 - methyl - 6,11 - dioxo - 1 - phenyl - 1H - oxazolo[5,4,3 - jk]pyrrolo[2,1 - c][1,4] benzodiazepine-9-trans-acrylamide in 30 ml. of dry tetrahydrofuran (distilled from lithium aluminum hydride) is cooled under nitrogen to −60°. To this solution, 30 mg. (0.8 mmole) of lithium aluminum hydride is added and the reaction mixture stirred at −50° to −60° for 1 hour. Excess of lithium aluminum hydride is then destroyed by dropwise addition of 5 ml. of water and the reaction mixture concentrated to dryness at 15–20° by means of a rotary evaporator. The yellow residue is then equilibrated between 150 ml. of ethyl acetate and 150 ml. of a saturated solution of Rochelle salt. The organic phase is washed once with Rochelle salt solution, twice with water, and the aqueous phases backwashed three times with ethyl acetate. The ethyl acetate solutions are combined, dried over sodium sulfate, filtered and evaporated under reduced pressure to dryness at 25–30° to give crude (10aS, 11R) - 6,10,10a,11 - tetrahydro - 11 - hydroxy - 3 -methyl-6 - oxo - 1 - phenyl - 1H - oxazolo[5,4,3 - jk]pyrrolo[2,1-c][1,4]benzodiazepine-9-trans-acrylamide.

(b) 50 ml. of 0.01 N hydrochloric acid is added to the product of part (a) dissolved in 100 ml. of methanol. After standing at room temperature for 21 hours, the reaction mixture is extracted with 3× 200 ml. and 2× 100 ml. of chloroform-n-butanol (3:1 v./v.). The organic phases, after being washed with 3× 200 ml. of water, are combined and evaporated to dryness at 30–40° under high vacuum. The yellow residue is then dissolved in 50 ml. of methanol and refluxed on a steambath for 30 min. Removal of the solvent gives the product which is then dissolved in 10 ml. of methanol. After 5 ml. of water is added, the solution is stored at −20° for 60 hours, whereupon crystallization occurs. The crystals are filtered, washed with methanol-water (1:1 v./v.) and dried over calcium chloride in vacuo, thus affording the hydrate of compound 14 which decomposes above 120° in vacuo and melts undepressed in admixture with an authentic sample. Additional product is obtained by crystallization of the mother liquor. The product which results is identical in all respects with an authentic sample of the hydrate of compound 14.

Example 16.—(11R,11aS) - 5,10,11,11a - tetrahydro-9, 11 - dihydroxy - 8 - methyl - 5 - oxo - 1H - pyrrolo[2, 1-c][1,4]benzodiazepine-2-trans-acrylamide (a) 3 grams of the product of the preceding example is dissolved in 600 ml. of acetonitrile. The resulting solution is concentrated by distillation at atmospheric pressure to a small volume (about 300 ml.). A crystalline solid is obtained which is again dissolved in 450 ml. of acetonitrile and the resulting solution is concentrated by distillation at atmospheric pressure to about 100 ml. The crystalline product (Compound 15) which results has a melting point of 205–206° dec. (vac.).

(b) 0.1 gram of the product obtained in part (a) is dissolved in 50 ml. of boiling acetonitrile. An excess of water is then added and the mixture allowed to stand for one hour at room temperature. The resulting solution is concentrated by distillation to a small volume at room temperature under vacuum. On standing, crystals of the compound (11R,11aS) - 5,10,11,11a - tetrahydro - 9,11-dihydroxy - 8 - methyl - 5 - oxo - 1H - pyrrolo[2,1-c][1, 4]benzodiazepine-2-trans-acrylamide (Compound 16) are obtained which melt at 188–194° dec. (vac.).

Example 17.—(11aS) - 9 - benzoyloxy - 5,10,11,11a-tetrahydro - 8 - methyl - 5,11 - dioxo - 1H - pyrrolo[2, 1-c][1,4]benzodiazephine-2-trans-acrylonitrile (a) Pure benzoic anhydride (200 g., 884 mmoles) is dissolved in freshly distilled triethylamine (1.4 l.), the solution preheated to 55° and 40.0 g. (115 mmoles) of the hydrate of Compound 14 is added. The resulting suspension is then stirred under anhydrous conditions at 55° for 4½ hours, after which the hot reaction mixture is filtered. The solids are washed with warm triethylamine (150 ml.) and dried in vacuo at 30°. The product is then digested with 2 l. hot acetone, filtered and washed thoroughly with the same solvent. The filtrate is discarded and the solid crystallized from acetone to give compound 20. Crystallization of the mother liquor affords an additional amount of the compound.

(b) The combined product of part (a) is added to 1.6 l. of freshly distilled isopropenyl acetate and 6.7 ml. of glacial acetic acid. The resulting suspension is stirred and refluxed for 30 hours under anhydrous conditions. The reddish reaction mixture is then cooled to 10°, filtered by means of a Büchner funnel and the crystals washed with 150 ml. of isopropenylacetate followed by 300 ml. of ether. The remaining yellow solid is dried at room temperature under high vacuum, thus affording crude compound 21, M.P. 251° (vac., dec.). A sample recrystallized twice from hot acetonitrile melts at 258° (vac., dec.) and upon analysis shows $[\alpha]_D^{25}+842°$ (c. 1.07, AcNMe$_2$).

Analysis.—Calcd. for $C_{23}H_{19}N_3O_4$ (percent): C, 68.81; H, 4.77; N, 10.47. Found (percent): C, 68.93; H, 4.83; N, 10.45.

(c) The product from part (b) is then dissolved in 16.5 l. of hot acetone and, after adjusting to room temperature, 1.65 l. of distilled water is added. After 45 min., the yellow solution is concentrated by means of a rotary evaporator (bath temperature below 30°; the receiving flask cooled with a mixture of Dry Ice and acetone) until the acetone is essentially removed. The precipitated product is then filtered off, washed with distilled water and dried over calcium chloride to constant weight. Crude compound 22 is thus obtained.

(d) Under nitrogen, 28.1 g. (28 mmole) of chromium trioxide is added at 5° to 450 ml. of freshly distilled pyridine. The resulting reddish mixture is then stirred at room temperature for 1 hour (color change to brown) after which 28.1 g. (67 mmole) of the above described crude compound 22 dissolved in 230 ml. of freshly distilled pyridine, is added at 5° over a period of 15 minutes. The resulting black reaction mixture is then stirred at room temperature overnight and the solvent subsequently removed under high vacuum (bath temperature below 35°). The residue is digested 6 times with 1 l. portions of hot acetone, the soluble part decanted and filtered through diatomaceous earth. The combined filtrates, after being taken to dryness, give a dark brown solid which is then chromatographed on 800 g. of silica gel. The material is applied to the column in admixture with diatomaceous earth in a methylene chloride slurry. Elution with methylene chloride-acetone (1:1 v./v.) affords fractions which, according to TLC-analysis, contain as the major product the desired material. These fractions are then triturated with ether, filtered, and dried to give crude (11aS) - 9 - benzoyloxy - 5,10,11,11a-tetrahydro - 8 - methyl - 5,11 - dioxo - 1H - pyrrolo[2,1-c][1,4]benzodiazephine-2-trans - acrylamide (compound 18).

(e) A mixture of p-toluenesulfonyl chloride (18.8 g., 98 mmoles) and 10.35 g. (24.8 mmoles) of compound 18 is dissolved in 425 ml. of pyridine and the solution stirred at 50–55° for 1½ hours. The solvent is then removed under reduced pressure at 40–45° and the remaining brown residue stirred with 700 ml. of ether for ½ hour. The suspension is then filtered, the filtrate discarded, and the solids chromatographed on 600 g. of magnesia-silica get (Florisil). Fractions which are obtained by eluting with a mixture of methylene chloride-ethyl acetate (9:1 v./v.) contain, according to TLC-analysis, the desired product. Crystallization of these fractions from methylene chloride-ether affords pure (11aS) - 9 - benzoyloxy - 5,10,11,11a - tetrahydro - 8- methyl - 5,11 - dioxo - 1H - pyrrolo[2,1c-][1,4]benzodiazepine - 2 - trans - acrylonitrile, M.P. 295–296° (vac.) (compound 19).

We claim:
1. A method for producing a compound of the formula

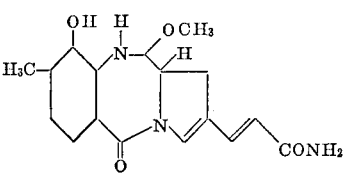

I which comprises:
(a) reacting in a basic medium at room temperature L-4-hydroxy-proline lower alkyl ester and a 3-benzyloxy-2-nitro-p-toluoyl halide, anhydride or ester;
(b) treating the product of step (a) with sodium dithionite at a temperature of from about 35° C. to about 45° C. thereby reducing the nitro group thereof;
(c) maintaining the product of step (b) at reflux temperature in an organic solvent in an inert atmosphere for a sufficient period of time to produce, as a product, a compound of the formula

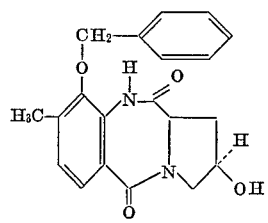

(d) treating the product of step (c) with an oxidizing agent at room temperature to produce a product of the formula

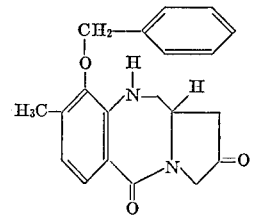

III (e) treating the product of step (d) with a trilower-alkylphosphonoacetate at about 10° C. for from about 30 minutes to about 2 hours;
(f) treating the product of step (e) with a reducing agent comprising di-isobutylaluminum hydride at a temperature between from about minus 50° C. to about minus 70° C.;
(g) treating the product produced in step (f) in situ with an alkali metal cyanide thereby producing a mixture of epimeric cyanohydrins;
(h) treating the mixture of epimeric cyanohydrins produced in step (g) with methanesulfonyl chloride in pyridine at a temperature of from about 0° C. to about 5° C., thereby producing a mixture of epimeric mesylates;
(i) maintaining the mixture of epimeric mesylates produced in step (h) at reflux temperature in an organic solvent in an inert atmosphere and in the presence of an organic base for from about 10 hours to about 15 hours;
(j) treating the product of step (i) with trifluoroacetic acid at room temperature for about 2.5 hours;
(k) treating the product of step (j) with benzaldehyde dimethylacetal in an inert atmosphere at a temperature of from about 185° C. to about 210° C.;
(l) treating the product of step (k) with polyphosphoric acid at a temperature of about 95° C.;
(m) treating the product of step (l) with a reducing agent selected from the group consisting of lithium aluminum hydride and sodium borohydride;
(n) treating the product of step (m) with methanolic hydrochloric acid for a sufficient time to hydrolyze it thereby producing a product of said Formula I; and
(o) recovering said product by crystallization.

2. The method according to claim 1 wherein said basic medium of step (a) comprises triethylamine.
3. The method according to claim 1 wherein said organic solvent in step (c) is xylene and said inert atmosphere is nitrogen.
4. The method according to claim 1 wherein said oxidizing agent of step (d) is chromic acid.
5. The method according to claim 1 wherein the reducing agent in step (m) is lithium aluminum hydride and said treatment of the product of step (l) is carried out in tetrahydrofuran at a temperature of about −50° C.
6. The method according to claim 1 wherein the reducing agent in step (m) is sodium borohydride and said treatment of the product of step (l) is carried out in methanol at about 5° C.

References Cited
UNITED STATES PATENTS
3,361,742    1/1968    Berger et al. _____ 260—239.3

HENRY R. JILES, Primary Examiner
R. T. BOND, Assistant Examiner

U.S. Cl. X.R.
260—326.3; 424—244, 269